US010390078B2

(12) United States Patent
Zhang et al.

(10) Patent No.: US 10,390,078 B2
(45) Date of Patent: Aug. 20, 2019

(54) MOBILE DEVICE CONTROLLED DYNAMIC ROOM ENVIRONMENT USING A CAST DEVICE

(71) Applicant: Verizon Patent and Licensing Inc., Arlington, VA (US)

(72) Inventors: Gong Zhang, Cambridge, MA (US); Jian Huang, Sudbury, MA (US); Gaurav D. Mehta, Brookline, MA (US); Jianxiu Hao, Acton, MA (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 123 days.

(21) Appl. No.: 15/351,589

(22) Filed: Nov. 15, 2016

(65) Prior Publication Data
US 2017/0064381 A1    Mar. 2, 2017

Related U.S. Application Data

(63) Continuation of application No. 14/259,834, filed on Apr. 23, 2014.

(51) Int. Cl.
| | |
|---|---|
| *H04N 21/41* | (2011.01) |
| *H04N 21/436* | (2011.01) |
| *H04N 21/81* | (2011.01) |
| *H04N 21/418* | (2011.01) |
| *H04N 21/44* | (2011.01) |
| *H04N 21/61* | (2011.01) |
| *H04N 21/858* | (2011.01) |

(52) U.S. Cl.
CPC ... *H04N 21/43615* (2013.01); *H04N 21/4122* (2013.01); *H04N 21/4126* (2013.01); *H04N 21/4131* (2013.01); *H04N 21/4183* (2013.01); *H04N 21/44008* (2013.01); *H04N 21/6131* (2013.01); *H04N 21/8186* (2013.01); *H04N 21/8586* (2013.01)

(58) Field of Classification Search
CPC ......... H04N 21/4131; H04N 21/43615; H04N 21/6131; H04N 21/44008; H04N 21/4122; H04N 21/4183; H04N 21/8186; H04N 21/4126; H04N 21/8586
See application file for complete search history.

(56) References Cited

U.S. PATENT DOCUMENTS

| | | | |
|---|---|---|---|
| 2004/0015983 A1* | 1/2004 | Lemmons | H04N 5/44 725/12 |
| 2005/0206788 A1* | 9/2005 | Eves | H04N 5/64 348/602 |
| 2007/0061725 A1* | 3/2007 | Isaac | H04N 7/17318 715/717 |
| 2010/0071535 A1 | 3/2010 | McKinney et al. | |
| 2010/0244745 A1* | 9/2010 | Wendt | A63F 13/02 315/312 |
| 2010/0265414 A1* | 10/2010 | Nieuwlands | H04N 21/4394 348/739 |
| 2011/0075036 A1* | 3/2011 | Galeazzi | H04N 5/64 348/602 |

(Continued)

*Primary Examiner* — Junior O Mendoza (57) ABSTRACT

A mobile device analyzes data associated with media handled by a cast device connected to a display device. The mobile device causes control signals to be sent, via the one or more communication interfaces, to one of multiple different devices in a room to change an operational parameter associated with the one of the multiple different devices.

20 Claims, 7 Drawing Sheets

(56) References Cited

U.S. PATENT DOCUMENTS

| | | | |
|---|---|---|---|
| 2011/0190911 A1* | 8/2011 | Iwanami | H04N 21/235 |
| | | | 700/90 |
| 2012/0013257 A1* | 1/2012 | Sibert | H05B 37/0245 |
| | | | 315/152 |
| 2013/0198786 A1* | 8/2013 | Cook | H05B 37/0272 |
| | | | 725/81 |
| 2014/0267906 A1* | 9/2014 | Mickelsen | H04N 21/4131 |
| | | | 348/515 |
| 2015/0092110 A1* | 4/2015 | Li | H04N 21/43 |
| | | | 348/602 |

* cited by examiner

MOBILE DEVICE CONTROLLED DYNAMIC ROOM ENVIRONMENT USING A CAST DEVICE

RELATED APPLICATION

The present application claims priority from U.S. application Ser. No. 14/259,834, filed Apr. 23, 2014, the contents of which are hereby incorporated by reference herein in their entirety.

BACKGROUND

Cast devices, such as Chromecast or Airplay devices, typically plug into a port of a television (TV). A mobile application executed on a mobile device, such as a smartphone, tablet, or laptop, sends a user's favorite TV shows, movies, music and other media content to the TV via the cast device. While the media content is streaming to the TV via the cast device, the user can continue to use the mobile device as a second screen device for searching, browsing, or other user activity.

DETAILED DESCRIPTION OF THE PREFERRED EMBODIMENTS

The following detailed description refers to the accompanying drawings. The same reference numbers in different drawings may identify the same or similar elements. The following detailed description does not limit the invention.

Figure 1:
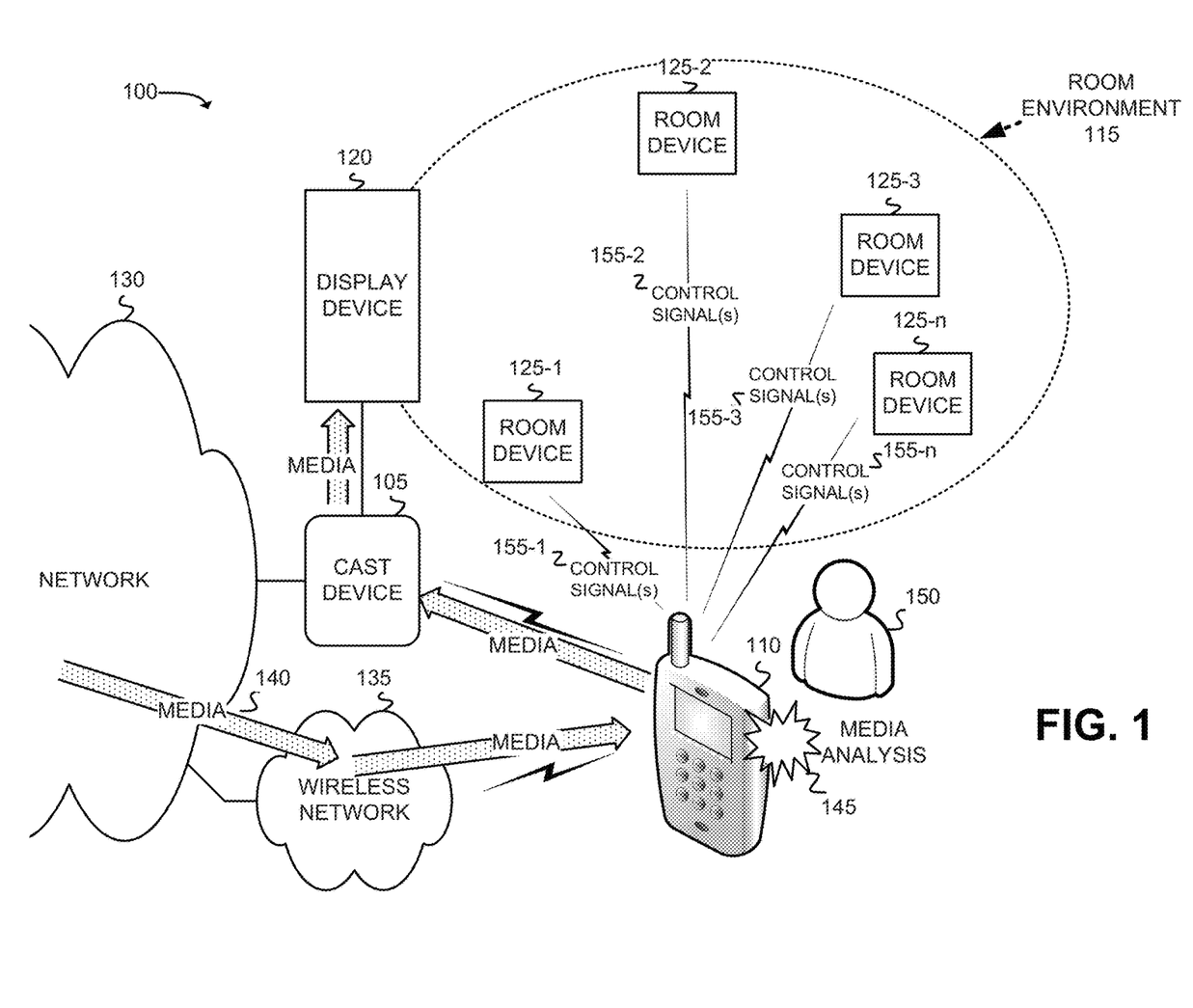
FIGS. 1-3 depict an exemplary network environment in which different implementations enable a mobile device to dynamically control a room environment based on media content being delivered to a display device by a cast device.
Figure 2:
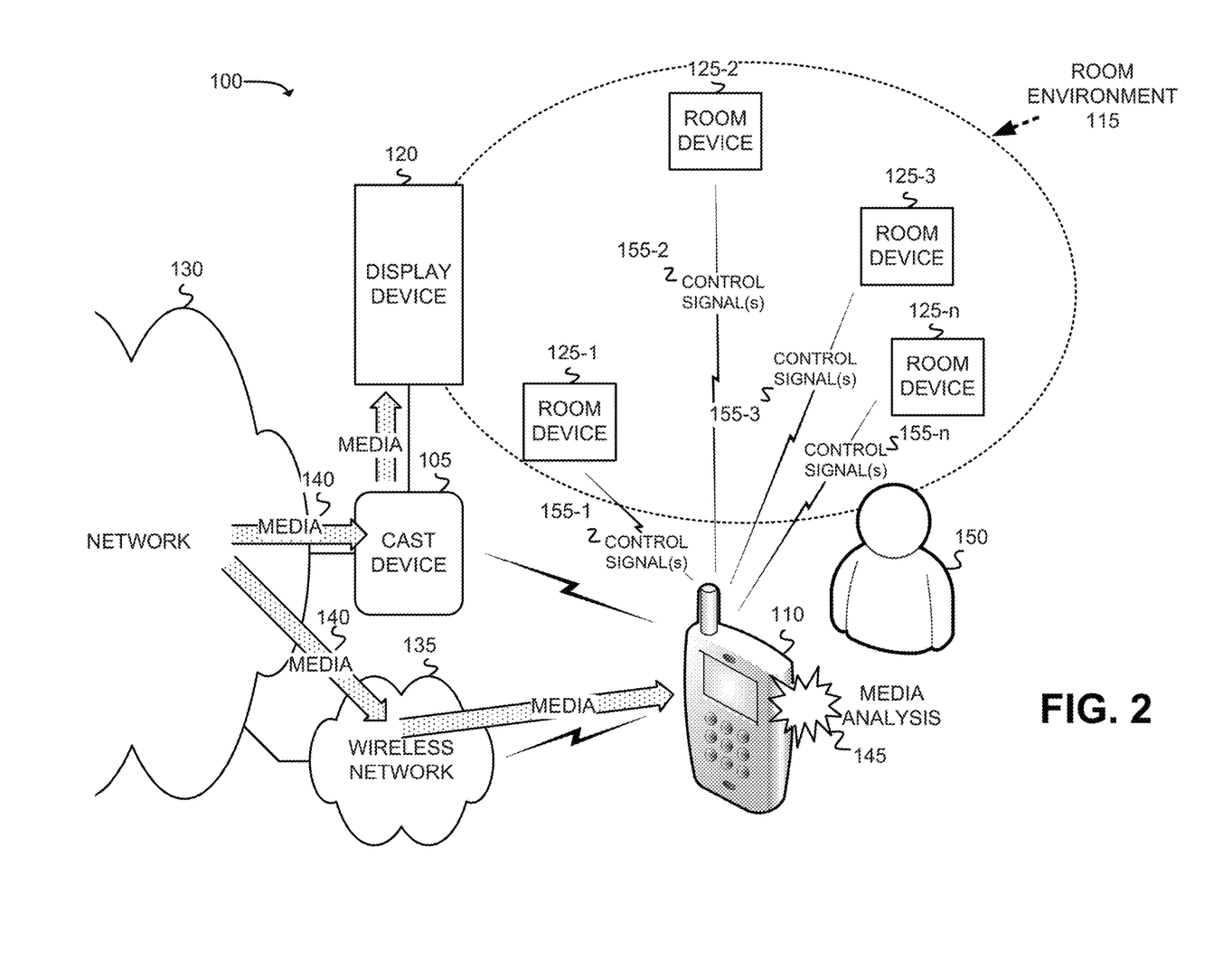
Figure 3:
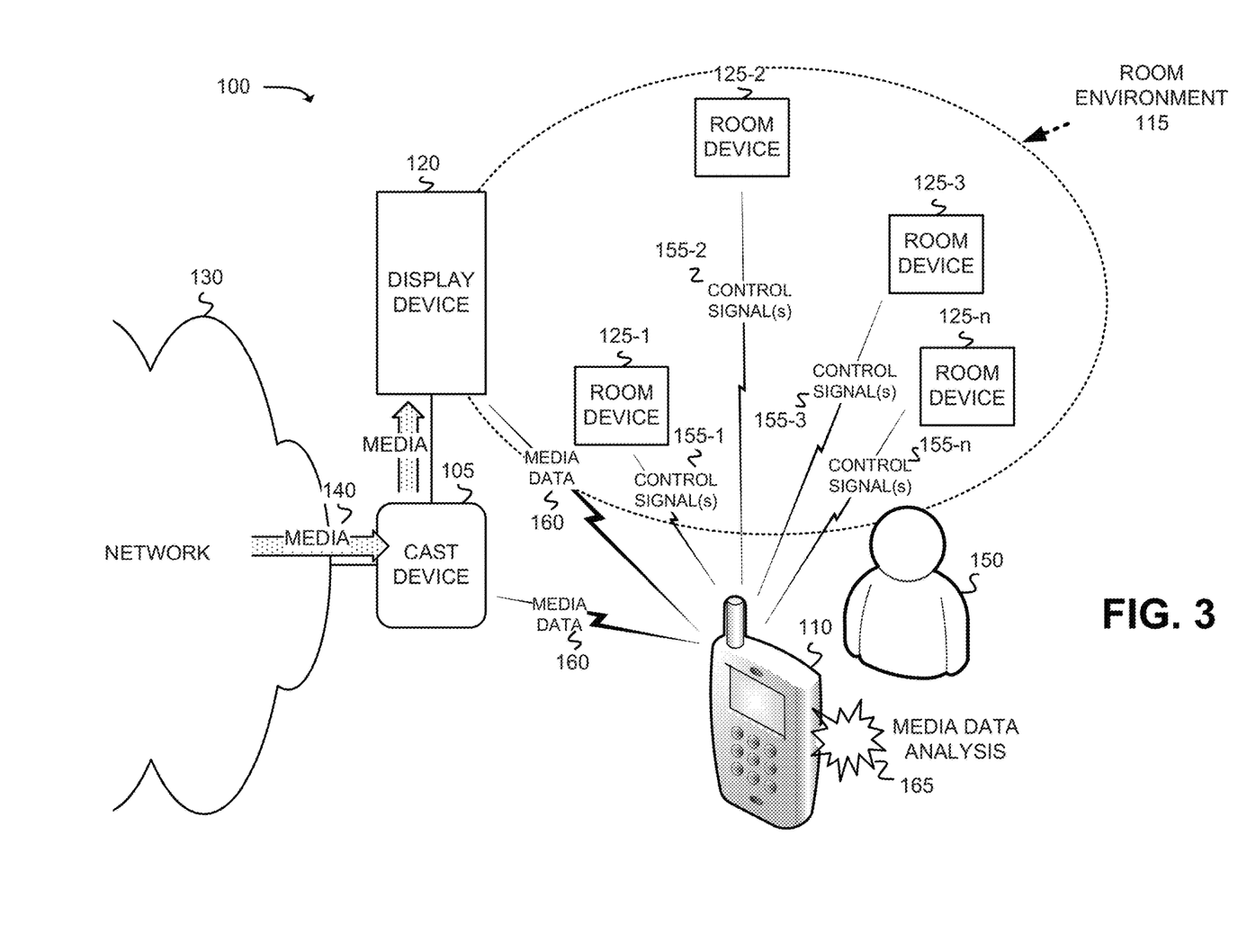

FIGS. 1-3 depict different implementations of an exemplary network environment 100 in which a mobile device dynamically controls a room environment based on media content being delivered by a cast device to a display device. Network environment 100 may include a cast device 105, a mobile device 110, a room environment 115, a network 130, and a wireless network 135. As further shown in FIG. 1, room environment 115 may include a display device 120 and one or more room devices 125-1 through 125-n.

Cast device 105 may include a device, such as a Chromecast or Airplay device, that plugs into a port of display device 120 and which plays digital media (e.g., streamed audio, video or image content) on display device 120. Cast device 105 may receive media content, or an address (e.g., link) to retrieve the media content, from mobile device 110 so that cast device 105 may stream the media content to display device 120. The media content may include, for example, television (TV) shows, movies, music and/or other video, audio or image media content. Cast device 105 may include wired or wireless communication interfaces for communicating with display device 120, mobile device 110, network 130 and/or wireless network 135. In alternative embodiments, cast device 105 may be omitted from network environment 100, and, instead, display device 120 may include a SmartTV that performs functions described herein as being performed by cast device 105. In still further alternative embodiments, cast device 105 may also be omitted from network environment 100 and, instead, the functions described herein as being performed by cast device 105 may be performed by a set-top box (STB) (connected to display device 120 and further connected to network 130), or by a dongle connected to display device 120. In these alternative embodiments, display device 120 and mobile device 110 may be connected within a same Wi-Fi network.

Mobile device 110 may include a portable electronic device, having wireless communication capabilities, that may communicate with wireless network 135, network 130, cast device 105 and/or room devices 125-1 through 125-n. Mobile device 110 may include, for example, a laptop, palmtop or tablet computer having wireless capability; a cellular telephone (e.g., a "smart" phone); or a personal digital assistant (PDA) having wireless capability. Mobile device 110 may be carried and operated by a user 150, who may be located within, or outside of, room environment 115 (shown outside in FIGS. 1-3). User 150 may use mobile device 110 for additional functions other than control of operational parameters associated with room devices 125 of room environment 115. For example, user 150 may use mobile device 110 for web browsing. Mobile device 110 may execute a room environment application that implements the room device control process of FIG. 7 (below). The room environment application may be downloaded from a source in network 130.

Display device 120 may include a device having audio, video and image displaying capabilities. Display device 120 may include, for example, a TV or monitor. Display device 120 may include a port for connecting to cast device 105. In some implementations, display device 120 may additionally, or alternatively, include a sound system device that connects to one or more room devices 125 that each includes a speaker.

Room devices 125-1 through 125-n may include devices located within room environment 115. Each of room devices 125-1 through 125-n may have an internal device control unit, or an external device control unit, to which mobile device 110 can send respective control signals 155-1 through 155-n via, for example, Wi-Fi or BlueTooth, to control operational parameters of room devices 125-1 through 125-n. Though not depicted in FIGS. 1-3, one or more of room devices 125-1 through 125-n may connect to network 130 and/or wireless network 135. Room devices 125-1 through 125-n may include, for example, an air conditioning unit, a fan, an audio speaker, a light, or a hot tub.

Network 130 may include one or more different types of networks including, for example, a Public Switched Telephone Network (PSTN), a local area network (LAN), a wide area network (WAN), a metropolitan area network (MAN), an intranet, the Internet, or a cable network (e.g., an optical cable network). Wireless network 135 may include a satellite network, a Public Land Mobile Network (PLMN), or a wireless LAN or WAN (e.g., Wi-Fi). In one implementation, wireless network 135 may be replaced by a wireless network access point (e.g., a wireless router) that connects to network 130, and mobile device 110 may communicate directly with network 130 via the wireless network access point, avoiding the use of wireless network 135.

The configuration of network components of network environment 100 illustrated in FIG. 1 (and FIGS. 2-3 below) is for illustrative purposes. Other configurations may be implemented. Therefore, network environment 100 may include additional, fewer and/or different components that may be configured in a different arrangement than those depicted in FIGS. 1-3. For example, network environment 100 may include any number of mobile devices 110, room environments 115, display devices 120, and/or cast devices 105. Though not shown in FIGS. 1-3, participants, other than user 150, may be present in room environment 115 during playback of media at cast device 105 and display device 120. Each of the participants may, or may not, have a mobile device 110 of their own for controlling one or more room devices 125 in room environment 115.

In the implementation depicted in FIG. 1, mobile device 110 may receive content media 140 from a media source in network 130 and may then forward the content media 140 to cast device 105 for streaming to display device 120. As shown in FIG. 1, content media 140 may be delivered to mobile device 110 via network 130 and wireless network 135. Upon receipt of content media 140, mobile device 110 may perform a media analysis 145 upon the content media 140, and may further forward content media 140 to cast device 105 via, for example, a wireless connection. Upon receipt, cast device 105 may stream content media 140 to display device 120. Based on the results of the media analysis 145, mobile device 110 may send one or more control signals 155-1 through 155-n to respective ones of room devices 125-1 through 125-n in room environment 115 to change operational parameters associated with the room devices 125. For example, if a room device 125 includes a light, mobile device 110 may send a control signal to room device 125 that increases or decreases the intensity of the light based on the media content analyzed at mobile device 110.

In the implementation depicted in FIG. 2, content media 140 may be delivered via network 130 to mobile device 110 and to cast device 105, without any intervening forwarding of content media 140 via mobile device 110 to cast device 105 as in the implementation of FIG. 1. In the implementation of FIG. 2, mobile device 110 may provide a link to media to cast device 105, and cast device 105, using the link, may obtain content media 140 from a media source (e.g., a content provider) via network 130. Mobile device 110 may also obtain the same content media 140 from the media source via network 130 and wireless network 135. Upon receipt of content media 140 via network 130, cast device 105 may stream content media 140 to display device 120.

As shown in FIG. 2, upon receipt of content media 140, mobile device 110 may perform a media analysis 145 upon the content media 140. Based on the results of the media analysis 145, mobile device 110 may send one or more control signals 155-1 through 155-n to respective ones of room devices 125-1 through 125-n in room environment 115 to change operational parameters associated with the room devices 125. For example, if a room device 125 includes an air conditioning or heating unit, mobile device 110 may send a control signal to room device 125 that increases or decreases the temperature of the air circulated through room device 125.

In the implementation depicted in FIG. 3, cast device 105 or display device 120 may, based on content media 140 streamed via network 130, provide media data 160 to mobile device 110. The media data 160 may include data that identifies particular characteristics of content media 140 that mobile device 110 may use in an analysis. Mobile device 110 may provide an address (e.g., a link) for the media to cast device 105, and cast device 105, using the link, may obtain content media 140 from a content provider 130 via network 130.

Upon receipt of content media 140 via network 130, cast device 105 may stream content media 140 to display device 120. Cast device 105 may additionally extract specific characteristics from content media 140 and provide those characteristics as media data 160 to mobile device 110. Alternatively, upon receipt of content media 140 from cast device 105, display device 120 may extract the specific characteristics from content media 140 and provide those characteristics as media data 160 to mobile device 110.

Upon receipt of media data 160, mobile device 110 may perform a media data analysis 165 upon the media data 160. Based on the results of the media data analysis 165, mobile device 110 may send one or more control signals 155-1 through 155-n to respective ones of room devices 125-1 through 125-n in room environment 115 to change operational parameters associated with the room devices 125. For example, if a room device 125 includes audio speakers, mobile device 110 may send a control signal to room device 125 that increases or decreases the volume of the audio generated by the speakers.

Figure 4:
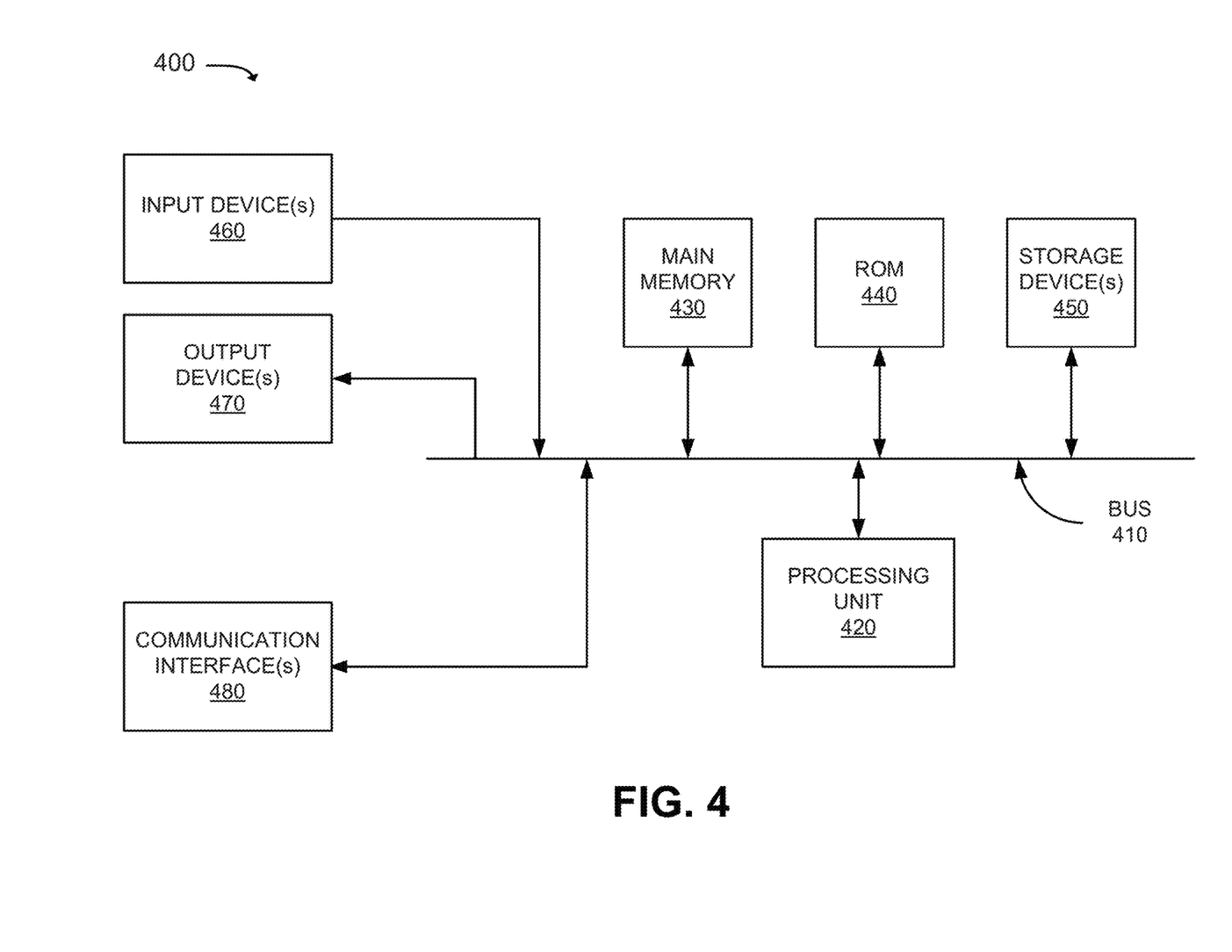
FIG. 4 is a diagram that depicts exemplary components of a device that may correspond to the mobile device, the cast device, and/or the display device of FIGS. 1-3.

FIG. 4 is a diagram that depicts exemplary components of a device 400. Mobile device 110, cast device 105 and display device 120 may each have the same or similar components in a same or similar configuration to that shown in FIG. 4. Device 400 may include a bus 410, a processing unit 420, a main memory 430, a read only memory (ROM) 440, a storage device 450, an input device(s) 460, an output device(s) 470, and a communication interface(s) 480. Bus 410 may include a path that permits communication among the elements of device 400.

Processing unit 420 may include one or more processors or microprocessors, or processing logic, which may interpret and execute instructions. Main memory 430 may include a random access memory (RAM) or another type of dynamic storage device that may store information and instructions for execution by processing unit 420. ROM 440 may include a ROM device or another type of static storage device that may store static information and instructions for use by processing unit 420. Storage device 450 may include a magnetic and/or optical recording medium. Main memory 430, ROM 440 and storage device 450 may each be referred to herein as a "tangible non-transitory computer-readable medium."

Input device 460 may include one or more mechanisms that permit an operator (or user) to input information to device 400, such as, for example, a keypad or a keyboard, a display with a touch sensitive panel, voice recognition and/or biometric mechanisms, etc. Output device 470 may include one or more mechanisms that output information to the operator, including a display, a speaker, etc. Communication interface(s) 480 may include a transceiver that enables device 400 to communicate with other devices and/or systems. For example, communication interface(s) 480 may include wired or wireless transceivers for communicating via networks 130 or 135. Communication interface(s) 480 may include a cellular network transceiver, a BlueTooth transceiver, and/or a Wi-Fi transceiver.

The configuration of components of device 400 illustrated in FIG. 4 is for illustrative purposes only. Other configurations may be implemented. Therefore, device 400 may include additional, fewer and/or different components, or differently arranged components, than those depicted in FIG. 4.

Figure 5:
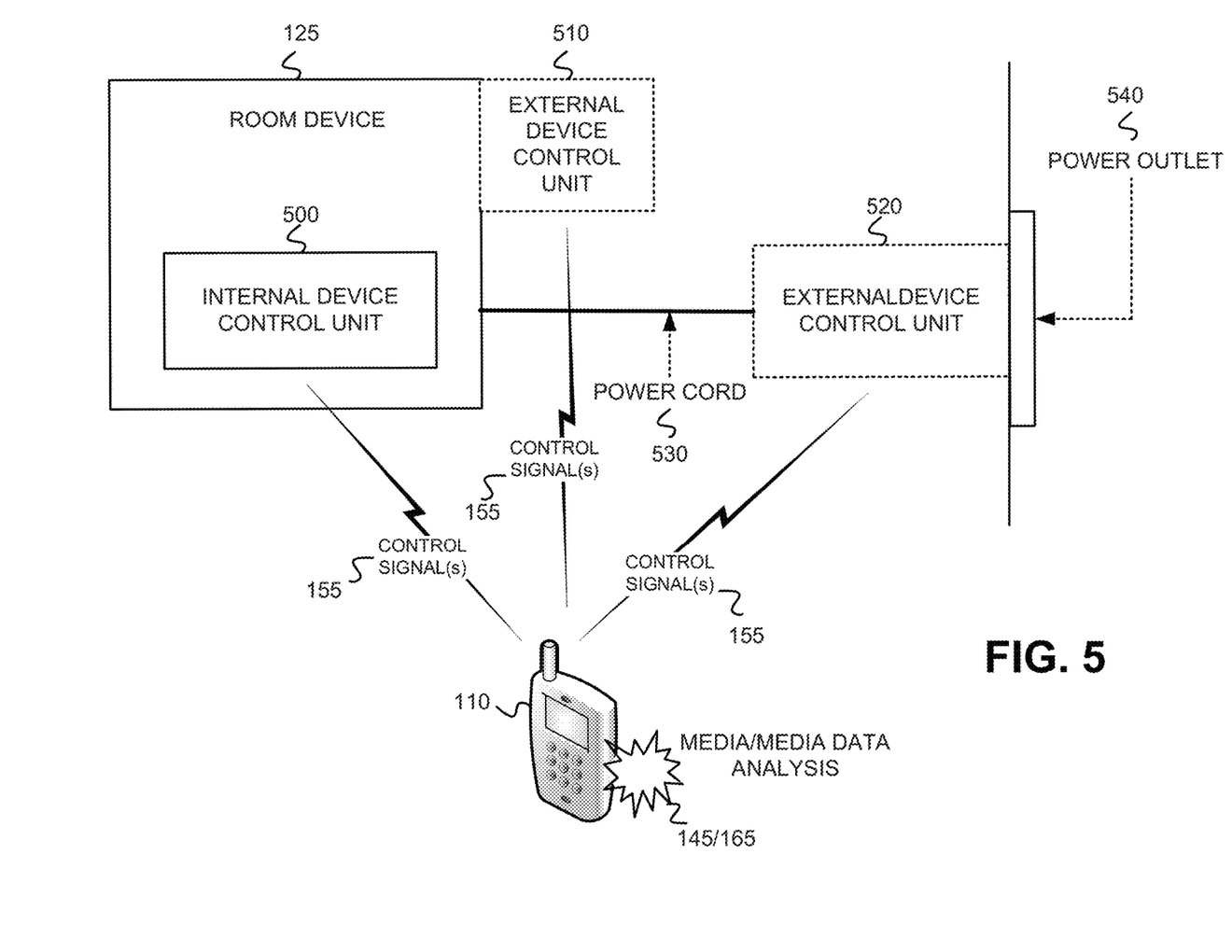
FIG. 5 depicts exemplary implementations for controlling parameters of a room device of FIGS. 1-3 based on a media/media data analysis performed by the mobile device of FIGS. 1-3.

FIG. 5 depicts exemplary implementations for controlling parameters of a room device 125 based on a media/media data analysis performed by mobile device 110. As depicted in FIG. 5, room device 125 may include an internal device control unit 500, an external device control unit 510 connected externally and directly to room device 125 (e.g., via a port such as a Universal Serial Bus (USB) port), and/or an external device control unit 520 connected externally and via a power cord 530 to a power outlet 540. As described with respect to FIGS. 1-3 above, mobile device 110 may perform an analysis 145 of media or media data and, based on the analysis, may generate one or more control signals 155 for controlling operational parameters associated with room device 125. If room device 125 includes internal device control unit 500, mobile device 110 may send one or more control signals to control unit 500 and, based on the one or more control signals, control unit 500 may control instructed operational parameters of room device 125. If room device 125 includes external device control unit 510, mobile device 110 may send one or more control signals to control unit 510 and, based on the one or more control signals, control unit 510 may send instruction signals via an input port to room device 125 to control one or more operational parameters. If room device 125 has a power cord 530 that connects to power outlet 540 via external device control unit 520, then mobile device 110 may send one or more control signals to control unit 520 and, based on the one or more control signals, control unit 520 may control the power supplied to room device 125 from power outlet 540. For example, control unit 520 may decrease the power supplied to room device 125, or turn off the supply of power from power outlet 540 entirely.

Figure 6:
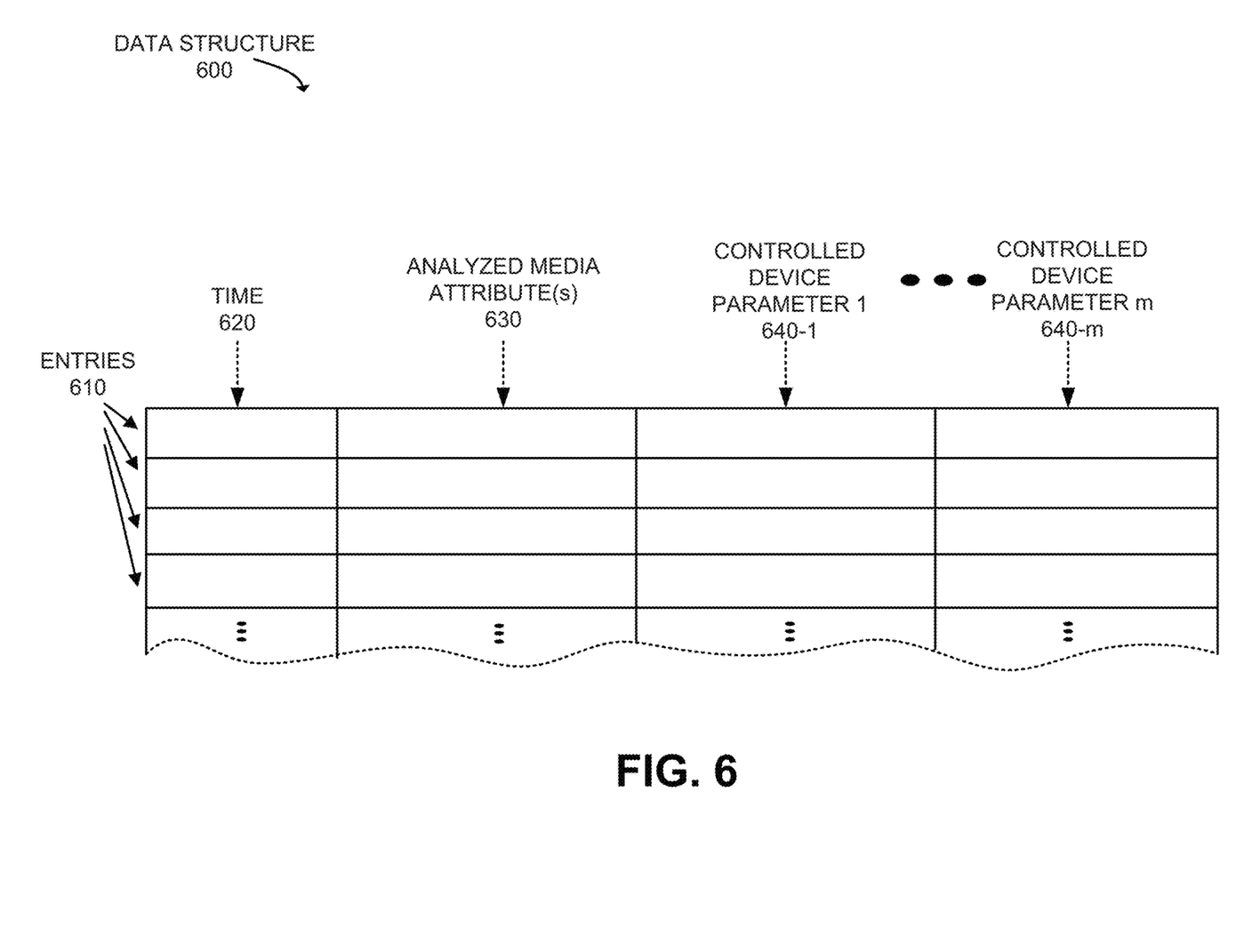
FIG. 6 depicts an exemplary data structure that may be stored in a memory or storage device of the mobile device or the cast device of FIGS. 1-3.

FIG. 6 depicts an exemplary data structure 600 that may be stored in memory 430 or storage device 450 of mobile device 110 or cast device 105. Data structure 600 may include multiple entries 610, each of which may include a time field 620, an analyzed media attribute(s) field(s) 630, and controlled device parameter fields 640-1 through 640-*m* (where m is an integer greater than or equal to 1). Data structure 600 may be associated with an item of media (e.g., a video). Each item of media analyzed by mobile device 110 may have its own data structure 600. The values stored in the fields of each entry 610 of data structure 600 may be manually entered, automatically pre-loaded, or populated based on the analysis performed by mobile device 110.

Time field 620 may store a time stamp, or a range of time, associated with the media corresponding to data structure 600. For example, mobile device 110 may perform an analysis of the media over a period of time of 3 minutes, running from five minutes (00:05:00) from the start of the media to eight minutes (00:08:00) from the start of the media.

Analyzed media attribute(s) field(s) 630 may comprise one or more fields that each stores data indicating a value for an attribute for the media associated with data structure 600. For example, if mobile device 110 analyzes the color of the media, then field(s) 630 may store a determined color RGB value (e.g., red, green, blue) for the media.

Controlled device parameter fields 640-1 through 640-*m* may each store a target value for controlling a respective operational parameter of a room device 125. For example, field 640-1 may store a value indicating "high speed" or "low speed" for instructing room device 125, that includes a fan, to change its fan speed to a high speed or a low speed.

As another example, field 640-*m* may store a specific temperature value for instructing room device 125, that includes an air conditioning unit, to change its temperature setting to the temperature value indicated in field 640-*m*.

The number, types, and content of the entries and/or fields in data structure 600 in FIG. 6 are for illustrative purposes. Other types of data structures having different numbers of, types of and/or content of, the entries and/or the fields may be implemented. Therefore, data structure 600 may include additional, fewer and/or different entries and/or fields than those depicted in FIG. 6. For example, each controlled device parameter field 640 may additionally be paired with a room device identifier (ID) field that identifies a particular room device 125 in room environment 115 whose operational parameter(s) identified in the corresponding filed 640 is to be controlled.

Figure 7:
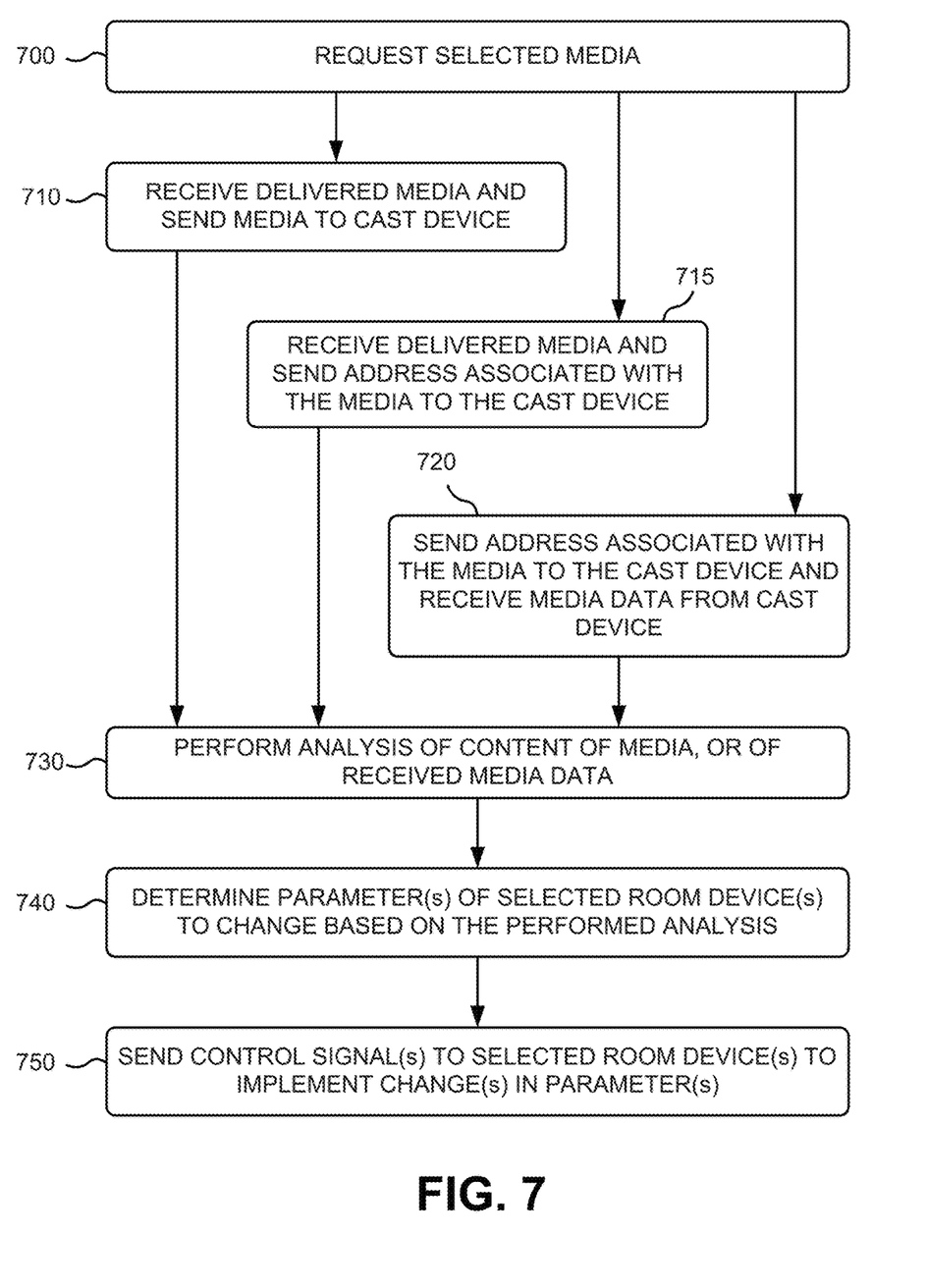
FIG. 7 is a flow diagram that illustrates an exemplary process for controlling operational parameters associated with devices in a room environment based on the content of media delivered to a display device via a cast device.

FIG. 7 is a flow diagram that illustrates an exemplary process for controlling operational parameters associated with devices 125 in a room environment 115 based on the content of media delivered to a display device via a cast device. The exemplary process of FIG. 7 may be implemented by mobile device 110. The exemplary process of FIG. 7 is described below with reference to FIGS. 1-3. In one embodiment, the exemplary process of FIG. 7 may be implemented with a delay between the analysis of the media, and the streaming of the media for playback by cast device 105 and display device 120. The delay permits the performance of blocks 730, 740 and 750 prior to the streaming of the media for playback at display device 120.

The exemplary process may include mobile device 110 requesting selected media (block 700). Mobile device 110 may request media from a media source (e.g., content server) connected to network 130. One of alternative blocks 710, 715 or 720 may then be performed based on a particular one of the implementations of FIGS. 1-3 being implemented. In the implementation of FIG. 1, mobile device 110 may receive the delivered media from the content server and may send the media to the cast device (block 710). Referring to FIG. 1, media 140 may be delivered (e.g., streamed) from the content server via network 130 and wireless network 135, and received at mobile device 110. Mobile device 110 may, in turn, stream media 140 to cast device 105.

In the implementation of FIG. 2, mobile device 110 may receive the delivered media from the media source, and may send an address associated with the media to the cast device (block 715). Referring to FIG. 2, media 140 may be delivered (e.g., streamed) from the media source via network 130 and wireless network 135, and mobile device 110 may send an address (e.g., a link at the content server) to cast device 105 such that cast device 105 may obtain the media from the media source. The media delivered from the content server may additionally include an address at the media source at which the media may be obtained from cast device 105.

In the implementation of FIG. 3, mobile device 110 may send an address associated with the media to the cast device, and may receive media data from the cast device (block 720). Referring to FIG. 3, the content server may deliver (e.g., stream) media 140 to cast device 105 based on an address (e.g., link) received from mobile device 110. Cast device 105 may extract relevant characteristics from the obtained media and send the extracted characteristics as media data 160 to mobile device 110.

Mobile device 110 may perform an analysis of the content of the media, or of the media data received from cast device 105 (block 730). Mobile device 110 may perform an analysis that identifies movement (e.g., an individual running) in the scene if the media is video; identifies one or more colors in the scene, or a brightness of the scene, if the media is video or an image(s); or identifies a sound volume if the media is video or audio. In some implementations, mobile device 110 may employ more sophisticated analysis algorithms that can perform image/video analysis to, for example, identify actions occurring in the scene (e.g., a quarterback passing a football, a car crashing, etc.). In other implementations, mobile device 110 may employ speech analysis algorithms to recognize the content of speech (i.e., what is being said) when the media is audio or video.

Mobile device 110 may determine parameter(s) of a selected room device(s) to change based on the performed analysis (block 740). Mobile device 110 may select more or more room devices 125 in room environment 115 and may determine which parameter(s) of the selected devices are to be changed. For example, mobile device 110 may identify room devices 125-1 through 125-n as including a light, an air conditioning unit, and a set of speakers connected to display device 120, and may select the light for the changing of parameters. With the light being selected, mobile device 110 may change one or more various operational parameters of the light: 1) on/off; 2) intensity of light (dimness or brightness); or 3) a strobe effect. As another example, mobile device 110 may select the air conditioning unit for the changing of parameters. With the air conditioning unit being selected, mobile device 110 may change one or more operational parameters of the AC unit: 1) on/off; 2) fan speed (high or low); or 3) temperature (cold or hot). In one embodiment, mobile device 110 may index data structure 600 for the item of media with the current playback time (or time range) and an analyzed media attribute to identify an entry 610 having a same time or time range value in time field 620 and a same analyzed attribute value in field 630. Mobile device 110 may then retrieve the values from fields 640-1 through 640-m for the identified entry 610 to identify the room devices 125, and the respective operational parameters for each of the identified room devices, that are to be changed.

Mobile device 110 may send control signal(s) to the selected room device(s) to implement a change(s) in the determine parameter(s) (block 750). Mobile device 110 may send an appropriate control signal 155 to a selected room device 125 to cause the room device 125 to change the selected operational parameter. For example, mobile device 110 may wirelessly transmit (e.g., via Bluetooth or Wi-Fi) a control signal 155 to a room device 125 that includes a set of speakers. The control signal 155 may increase the volume of the set of speakers.

Blocks 710-750, for an item of requested media, may be selectively repeated until the media finishes and is no longer being played back at display device 120. Therefore, the operational parameters of room devices 125-1 through 125-n in room environment 115 may change throughout media playback based on the analyzed content of the media.

The foregoing description of implementations provides illustration and description, but is not intended to be exhaustive or to limit the invention to the precise form disclosed. Modifications and variations are possible in light of the above teachings or may be acquired from practice of the invention. For example, while a series of blocks has been described with respect to FIG. 7, the order of the blocks may be varied in other implementations. Moreover, non-dependent blocks may be performed in parallel.

Certain features described above may be implemented as "logic" or a "unit" that performs one or more functions. This logic or unit may include hardware, such as one or more processors, microprocessors, application specific integrated circuits, or field programmable gate arrays, software, or a combination of hardware and software.

No element, act, or instruction used in the description of the present application should be construed as critical or essential to the invention unless explicitly described as such. Also, as used herein, the article "a" is intended to include one or more items. Further, the phrase "based on" is intended to mean "based, at least in part, on" unless explicitly stated otherwise.

In the preceding specification, various preferred embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

What is claimed is:

1. A method, comprising:
    sending, by a mobile device, an address associated with certain media to a second device, wherein the second device receives the certain media from a content server;
    receiving, at the mobile device and from the second device, data associated with the certain media, wherein the data associated with the certain media includes characteristics associated with content of the certain media;
    analyzing, by the mobile device, the characteristics associated with the content of the certain media, wherein the certain media comprises audio or video media;
    identifying current room devices currently residing in a room environment;
    selecting one or more current room devices from the identified current room devices based on the analysis;
    selecting at least one parameter of the selected one or more current room devices to control based on the analysis;
    determining target values for the selected at least one parameter of the selected one or more current room devices based on the analysis;
    populating a database with the determined target values for the selected at least one parameter of the selected one or more current room devices, wherein the database stores an indication of a time associated with the certain media, a first determined target value for a selected first parameter of a selected first current room device at the time, and a second determined target value for a selected second parameter of a selected second current room device at the time; and
    retrieving the determined target values for the selected at least one parameter of the selected one or more current room devices from the database and causing control signals to be sent to the selected one or more current room devices to cause the selected at least one parameter to be changed based on the determined target values, the time associated with the certain media, and the characteristics associated with the content of the certain media.

2. The method of claim 1, wherein the data associated with the certain media further comprises the certain media in streaming form and wherein the method further comprises:
    causing the certain media to be streamed from the mobile device to a cast device for media playback.

3. The method of claim 1, further comprising:
    causing the address to be sent to a cast device for retrieval and playback of the certain media by the cast device.

4. The method of claim 1, wherein the one or more current room devices comprises a plurality of room devices, and wherein the at least one parameter comprises a plurality of different parameters, and wherein each of the plurality of different parameters is associated with a different one of the plurality of room devices.

5. The method of claim 1, wherein analyzing the characteristics associated with the content of the certain media comprises:
identifying movement within a scene contained in the video media,
identifying actions occurring within the scene of the video media, or
using a speech analysis algorithm to recognize a content of the speech within the audio or video media.

6. The method of claim 1, wherein the second device includes a cast device and wherein the characteristics associated with the content of the certain media comprise data that identifies one or more characteristics, of the certain media, determined by the cast device.

7. The method of claim 1, wherein causing the control signals to be sent to the selected one or more current room devices further comprises:
causing the control signals to be sent from the mobile device, via a wireless local area network (LAN) or wide area network (WAN) or via a personal area network (PAN), to the selected one or more current room devices.

8. A non-transitory computer-readable medium containing instructions executable by at least one processor of a device, the computer-readable medium comprising:
one or more instructions for sending an address associated with certain media to a second device, wherein the second device receives the certain media from a content server;
one or more instructions for receiving, from the second device, data associated with the certain media, wherein the data associated with the certain media includes characteristics associated with content of the certain media;
one or more instructions for analyzing the characteristics associated with the content of the certain media, wherein the certain media comprises audio or video media;
one or more instructions for identifying current room devices currently residing in a room environment;
one or more instructions for selecting one or more current room devices from the identified current room devices based on the analysis;
one or more instructions for selecting at least one parameter of the selected one or more current room devices to control based on the analysis;
one or more instructions for determining target values for the selected at least one parameter of the selected one or more current room devices based on the analysis;
one or more instructions for populating a database with the determined target values for the selected at least one parameter of the selected one or more current room devices, wherein the database stores an indication of a time associated with the certain media, a first determined target value for a selected first parameter of a selected first current room device at the time, and a second determined target value for a selected second parameter of a selected second current room device at the time; and
one or more instructions for retrieving the determined target values for the selected at least one parameter of the selected one or more current room devices from the database and causing control signals to be sent to the selected one or more current room devices to cause the selected at least one parameter to be changed based on the determined target values, the time associated with the certain media, and the characteristics associated with the content of the certain media.

9. The non-transitory computer-readable medium of claim 8, wherein the data associated with the certain media comprises the certain media in streaming form and wherein the non-transitory computer-readable medium further comprises:
one or more instructions for causing the certain media to be streamed from the device to a cast device for media playback.

10. The non-transitory computer-readable medium of claim 8, wherein the non-transitory computer-readable medium further comprises:
one or more instructions for causing the address to be sent to a cast device for retrieval and playback of the certain media by the cast device.

11. The non-transitory computer-readable medium of claim 8, wherein the one or more current room devices comprises a plurality of room devices, and wherein the at least one parameter comprises a plurality of different parameters, and wherein each of the plurality of different parameters is associated with a different one of the plurality of room devices.

12. The non-transitory computer-readable medium of claim 8, wherein the one or more instructions for analyzing the characteristics associated with the content of the certain media comprises:
one or more instructions for identifying movement within a scene contained in the video media,
one or more instructions for identifying actions occurring within the scene of the video media, or
one or more instructions that use a speech analysis algorithm to recognize a content of the speech within the audio or video media.

13. The non-transitory computer-readable medium of claim 8, wherein the one or more instructions for causing the control signals to be sent to the selected one or more current room devices further comprises:
one or more instructions for causing the control signals to be sent from the device, via a wireless local area network (LAN) or wide area network (WAN) or via a personal area network (PAN), to the selected one or more current room devices.

14. The non-transitory computer-readable medium of claim 8, wherein the second device includes a cast device, and wherein the characteristics associated with the content of the certain media comprises one or more characteristics, of the certain media, determined by the cast device.

15. A portable electronic device, comprising:
one or more communication interfaces connected to at least one network, and configured to:
send an address associated with certain media to a second device, wherein the second device receives the certain media from a content server;
receive data associated with the certain media from the second device, wherein the data associated with the certain media includes characteristics associated with content of the certain media;
a processing unit configured to:
analyze the characteristics associated with the content of the certain media, wherein the certain media comprises audio or video media;

identify room devices currently residing in a room environment;

select one or more current room devices from the identified current room devices based on the analysis;

select at least one parameter of the selected one or more current room devices to control based on the analysis;

determine target values for the selected at least one parameter of the selected one or more current room devices based on the analysis;

populate a database with the determined target values for the selected at least one parameter of the selected one or more current room devices, wherein the database stores an indication of a time associated with the certain media, a first determined target value for a selected first parameter of a selected first current room device at the time, and a second determined target value for a selected second parameter of a selected second current room device at the time; and retrieve the determined target values for the selected at least one parameter of the selected one or more current room devices from the database; and cause control signals to be sent, via a first one of the one or more communication interfaces, to the selected one or more current room devices to cause the selected at least one parameter to be changed based on the determined target values, the time associated with the certain media, and the characteristics associated with the content of the certain media.

16. The portable electronic device of claim 15, wherein, when analyzing the characteristics associated with the content of the certain media, the processing unit is further configured to:
identify movement within a scene contained in the video media,
identify actions occurring within a scene of the video media, or
recognize a content of speech within the audio or video media.

17. The portable electronic device of claim 15, wherein the data associated with the certain media comprises the certain media in streaming form, and wherein a second one of the one or more communication interfaces is configured to:
stream the certain media from the portable electronic device to a cast device for media playback.

18. The portable electronic device of claim 15, wherein the one or more communication interfaces are further configured to:
send the address to a cast device for retrieval and playback of the certain media by the cast device.

19. The portable electronic device of claim 15, wherein the one or more current room devices comprises a plurality of room devices, and wherein the at least one parameter comprises a plurality of different parameters, and wherein each of the plurality of different parameters is associated with a different one of the plurality of room devices.

20. The portable electronic device of claim 15, wherein the second device includes a cast device, and wherein the characteristics associated with the content of the certain media comprises data that identifies one or more characteristics, of the certain media, determined by the cast device.

* * * * *